(12) United States Patent
Soubaras

(10) Patent No.: US 7,768,871 B2
(45) Date of Patent: Aug. 3, 2010

(54) METHOD OF SEISMIC PROCESSING OF THE TYPE COMPRISING DEPTH MIGRATION BEFORE ADDITION

(75) Inventor: Robert Soubaras, Orsay (FR)

(73) Assignee: CGG Veritas SA, Massy Cedex (FR)

( * ) Notice: Subject to any disclaimer, the term of this patent is extended or adjusted under 35 U.S.C. 154(b) by 250 days.

(21) Appl. No.: 11/811,089

(22) Filed: Jun. 8, 2007

(65) Prior Publication Data

US 2008/0279043 A1 Nov. 13, 2008

(30) Foreign Application Priority Data

Jun. 9, 2006 (FR) .................................. 06 05123

(51) Int. Cl.
*G01V 1/00* (2006.01)
(52) U.S. Cl. ....................................................... 367/38
(58) Field of Classification Search .................. 367/38, 367/24, 63
See application file for complete search history.

(56) References Cited

U.S. PATENT DOCUMENTS 6,021,094 A * 2/2000 Ober et al. ..................... 367/53
7,286,690 B2 * 10/2007 Kelly .......................... 382/109

FOREIGN PATENT DOCUMENTS

| FR | 2 784 195 | 4/2000 |
|----|-----------|--------|
| WO | WO2006/018728 | 2/2006 |

OTHER PUBLICATIONS

Schultz, P.S. et al., "Velocity Estimation and Downward Continuation by Wavefront Synthesis", Geophysics, vol. 43, 1978, pp. 691-714.
Rietveld, W.E.A et al., "Optimum Seismic Illumination of Hydrocarbon Reservoirs", Geophysics, vol. 57, 1992, pp. 1334-1345.
Duquet, B. et al., "3D Plane Wave Migration of Streamer Data", SEG 71st Annual International Meeting, Expanded Abstracts, 2001, pp. 1033-1036.
Romero, L.A. et al., "Phase Encoding of Shot Records in Prestack Migration", Geophysics, vol. 65, 2000, pp. 426-436.
Romero, et al., Phase Encoding of Shot Records in Prestack Migration, Geophysics, vol. 65, No. 2, Mar. 2000, pp. 426-436.
Stork, et al., Linear Aspects of Tomographic Velocity Analysis, Geophysics, vol. 56, No. 4, Apr. 1991, pp. 483-495.

* cited by examiner

*Primary Examiner*—Scott A Hughes
*Assistant Examiner*—Krystine Breier
(74) *Attorney, Agent, or Firm*—Strasburger & Price, LLP

(57) ABSTRACT

A seismic processing method of the migration type, comprising the steps of:

linearly combining downgoing waves generated at a plurality of shotpoints, and also upgoing waves recorded by a plurality of seismic sensors;
notionally propagating the composite waves as obtained in this way in order to obtain migrated downgoing and upgoing waves for different depths; and
determining at a plurality of depths at least one characteristic of the subsoil as a function of the upgoing and downgoing waves propagated in this way;

the downgoing (resp. upgoing) composite waves being calculated by a linear combination of downgoing (resp. upgoing) waves in which said downgoing (resp. upgoing) waves are weighted by the coefficients of a spatial modulation matrix which is a function of the positions of the shotpoints.

7 Claims, 2 Drawing Sheets

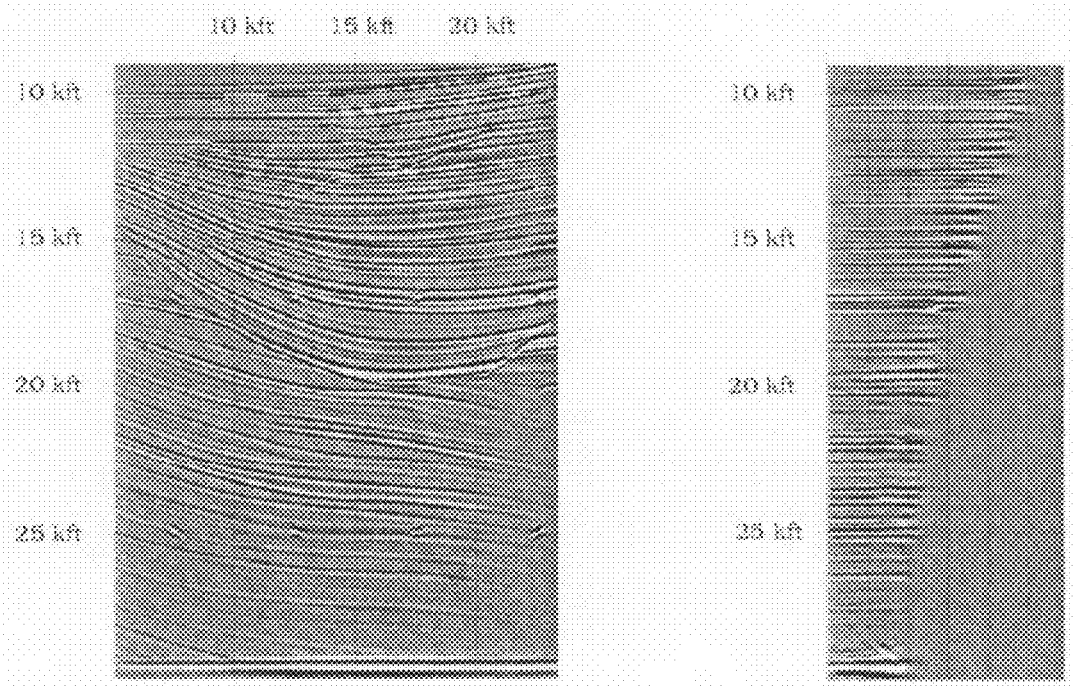
FIGURE 3
FIGURE 4
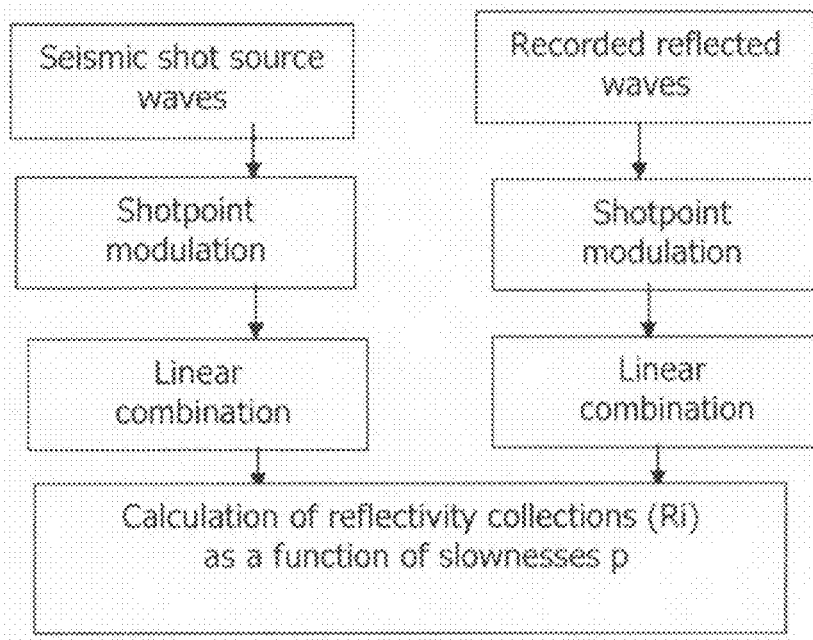
FIGURE 5

METHOD OF SEISMIC PROCESSING OF THE TYPE COMPRISING DEPTH MIGRATION BEFORE ADDITION

CROSS-REFERENCE TO RELATED APPLICATION

This application claims priority to French Application No. 0605123 filed Jun. 9, 2006 entitled "A Method of Seismic Processing of the Type Comprising Depth Migration Before Addition".

The present invention relates to a method of seismic processing of the type comprising depth migration before addition.

More precisely, it relates to a method of this type comprising a prior step of modulating shotpoints (the term "shot-record" can also be used instead of "shotpoints").

Depth migration prior to addition is a central step in seismic processing. It consists in focusing seismic events recorded in time as reflections indexed by depth. One of the most precise ways of performing this step is migration by shotpoints, which consists in numerically propagating an incident wave representing the seismic source and a reflected wave. The downgoing wave $d_n(f,x,y,z)$ is initialized at the surface at depth $z=0$, and for each frequency f, by a synthesized representation of the source, and the upgoing wave $u_n(f,x,y,z)$ is initialized by the wave recorded by the seismic sensors. Numerical propagation propagates these waves stepwise through layers of thickness Dz enabling the downgoing and upgoing waves $d_n(f,x,y,z)$ and $u_n(f,x,y,z)$ to be obtained for any depth z of the grid. The result of the migration is reflectivity calculated by summing over all these frequencies and all the shots the cross-correlation of the downgoing and upgoing waves:

$$r(x, y, z) = \sum_{f,n} \overline{d_n(f, x, y, z)} u_n(f, x, y, z) \quad (1)$$

The drawback of that method is that the set of shotpoints in the seismic acquisition $u_n(f,x,y,z)$ is represented by a single image $r(x,y,z)$. In general, it is desired to have a migration result that is a gather $r_i(x,y,z)$ such that:

$$r(x, y, z) = \sum_i r_i(x, y, z) \quad (2)$$

This makes it possible to analyze velocities by verifying that the seismic arrivals have the same arrival times over all the gathers. It is also possible to perform processing to attenuate multiple arrivals by rejecting events that present curvature in the depth-i plane of the gather.

STATE OF THE ART

Migration by shotpoint makes it possible to produce a gather by shotpoint in which $r_n(x,y,z)$ is the reflectivity provided by shotpoint n. However, this is not convenient given the large number of shotpoints ($10^5$ to $10^6$) in modern acquisition. In general, it is desired for gathers to comprise several tens of components.

Plane wave migration (Schultz and Claerbout (1978), Rietveld et al. (1992), Duquet et al. (2001)) is a method in which composite shots are constructed from individual shots, each composite shot being obtained by summing the individual shots after applying linear delays proportional to a given slowness value p (where slowness is the inverse of velocity), or in equivalent manner by constructing the composite shot of index m by weighting in the frequency domain the shot of index n on abscissa $x_n$ by $C_{mn}(f)=\exp(-2j p f p_m x_n)$. This linear superposition of downgoing waves and upgoing waves is followed by migration analogous to migration by shotpoint, with the composite shotpoints replacing the individual shotpoints. That technique has two drawbacks: it does not enable exactly the same image to be obtained as is obtained by shotpoint migration, and it does not give a criterion on the number of values of p to be migrated.

Romero et al. (2000) used composite shots obtained from other weightings that do not depend on the position of the source $x_n$ (linear phases, random phases, chirp, modified chirp). Those methods suffer from the defects of the preceding methods and in addition they do not make it possible to obtain interpretable gathers.

OBJECTS AND GENERAL PRESENTATION OF THE INVENTION

An object of the invention is to propose a method of processing with migration based on a composition of shots that enables exactly the same image to be obtained as is obtained by migrating shotpoints.

Another object of the invention is to propose a processing method of this type with a minimum number of composite shots to be migrated.

Yet another object of the invention is to propose a processing method with migration that enables gathers to be obtained that are analogous to those obtained when performing plane wave migration.

Specifically, the invention provides a seismic processing method of the migration type, comprising the steps of:
  linearly combining downgoing waves generated at a plurality of shotpoints, and upgoing waves recorded by a plurality of seismic sensors;
  notionally propagating the composite waves as obtained in this way in order to obtain migrated downgoing and upgoing waves for different depths; and
  determining at a plurality of depths at least one characteristic of the subsoil as a function of the upgoing and downgoing waves propagated in this way;
  the method further comprising the step of calculating the downgoing (resp. upgoing) composite waves by a linear combination of downgoing (resp. upgoing) waves in which said downgoing (resp. upgoing) waves are weighted by the coefficients of a spatial modulation matrix which is a function of the positions of the shotpoints.

DESCRIPTION OF THE FIGURES

FIGS. 3 and 4 are images obtained by shot modulation migration (FIG. 3) and for the gather (FIG. 4), applicable to a synthetic data set known as the Sigsbee model and to an embodiment of the invention.

FIG. 5 is a diagram showing the steps of an embodiment of the invention.

DESCRIPTION OF ONE OR MORE EMBODIMENTS OF THE INVENTION

General Principles

Figure 1:
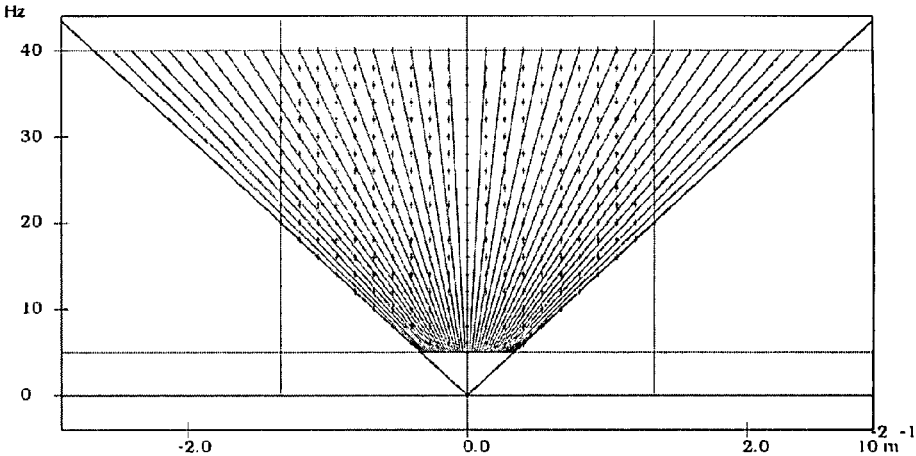
FIG. 1 represents in an f-k plane an example of composite shots to be migrated when performing migration by modulating shotpoints in accordance with an embodiment of the invention.

Condition for Exactness of Migration by Composite Shotpoint

Since migration by shotpoint is the most exact of migrations, the term "condition of exactness" can be used to designate a condition guaranteeing that the image obtained by some other migration is the same as that obtained by shotpoint migration. Such a condition is obtained below for composite shot migration.

The downgoing and upgoing waves at depth z=0 and corresponding to n individual shots of an acquisition are written $d_n(f,x,y,z=0)$ and $u_n(f,x,y,z=0)$ for n=0,N−1, and migration by composite shotpoints defines a composition matrix C(f) of dimension (M,N) enabling the following composite downgoing and upgoing waves to be obtained $D_m(f,x,y,z=0)$ and $U_m(f,x,y,z=0)$:

$$U_m(f, x, y, z = 0) = \sum_{n=0}^{N-1} C_{mn}(f) u_n(f, x, y, z = 0), \quad (3)$$

$$m = 0, M - 1$$

with the same linear relationship relating $D_m$ to $d_n$. Thereafter, shotpoint migration is performed for these two composite waves. To do that, the two waves are extrapolated in depth and the linearity of the extrapolation guarantees that the linear relationship (3) is valid for every depth z between $U_m(f,x,y,z)$ and $u_n(f,x,y,z)$ and similarly between $D_m(f,x,y,z)$ and $d_n(f,x,y,z)$. This can be written in matrix notation, using the vectors:

$$d(f)=[d_1(f,x,y,z), \ldots, d_{N-1}(f,x,y,z)]^T$$

and $$D(f)=[D_1(f,x,y,z), \ldots, D_{M-1}(f,x,y,z)]^T$$

and the matrix C(f) of elements $C_{mn}(f)$:

$$D(f)=C(f)d(f), U(f)=C(f)u(f) \quad (4)$$

The image obtained by composite shot migration is:

$$R(x, y, z) = \sum_f \sum_{n=0}^{M-1} \overline{D_m(f, x, y, z)} U_m(f, x, y, z) \quad (5)$$

$$= \sum_f D^*(f) U(f)$$

$$= \sum_f d^*(f) C^*(f) C(f) u(f)$$

If the matrix C(f) is unitary for all f, then $C^*(f)C(f)$:

$$R(x, y, z) = \sum_f d^*(f) C^*(f) C(f) u(f) \quad (6)$$

$$= \sum_f d^*(f) u(f)$$

$$= r(x, y, z)$$

$$= Id$$

which means that migration by composite shot with a unitary composition matrix produces the same image as migration by shotpoint.

Migration by Shotpoint Modulation

Consideration is given to migration by composite shotpoint where the number of composite shots M is equal to the number of original shots N and where the composition matrix is, for all frequencies, the matrix of the discrete spatial Fourier transform:

$$C_{mn}(f) = C_{mn} = \frac{1}{\sqrt{N}} \exp\left(2j\pi \frac{mn}{N}\right) \quad (7)$$

This matrix (which does not depend on f) is unitary so that the migration produces exactly the same image as migration by shotpoint. The equality of the images stems directly from Parseval's theorem.

As a general rule, the positions of the shots are regularly spaced apart on a grid of pitch Dx. The position of the shot of index n is then given by $x_n$=nDx. Since there are N shots, the total length of the set of shots is $x_{max}$=NDx. The pitch is defined in terms of wave number Dk=1/$x_{max}$ which makes it possible to define a grid of wave numbers $k_m$=mDk. This notation gives:

$$C_{mn} = \frac{1}{\sqrt{N}} \exp(2j\pi k_m x_n) \quad (8)$$

which shows that the composite shot of index m is obtained by summing individual shots after modulation with the wave number $k_m$.

If starting from N individual shots, it is decided to migrate M<N modulated components, then $x_{max}$=MDx is defined which becomes a periodization distance. The following are defined in the same manner Dk=1/$x_{max}$ and $k_m$=mDk, and $C_{mn}$ retains the expression (8). The properties of the Fourier transform ensure, in this case, that the image obtained by migration by shotpoint modulation is the same as the image that would have been obtained by migration in which the downgoing and upgoing waves were periodized:

$$R(x, y, z) = \sum_f \sum_{n=0}^{M-1} \left(\sum_k d_{n+kM}(f, x, y, z)\right)^* \left(\sum_k u_{n+kM}(f, x, y, z)\right) \quad (9)$$

Expression (9) shows that the image obtained is the same as that obtained by shotpoint migration providing the downgoing and upgoing waves $d_n$ and $u_n$ are decorrelated for |n−n'|≧M. This applies if M is equal to the number of individual shots N.

Number of Composite Shots to be Migrated

Nevertheless, it is the practice in shotpoint migration to define an illumination distance $x_{ill}$, and to consider that it is pointless to propagate downgoing and upgoing waves outside a range [−$x_{ill}$, $x_{ill}$] centered on the position of the source, since the waves are zero or negligible outside said range.

Under such circumstances, a periodization distance $x_{max}$=2$x_{ill}$ suffices to guarantee the exactness of migration by shotpoint modulation since, because a downgoing wave $d_n$ and an upgoing wave $u_{n+M}$ do not overlap, cross-correlation between them does not contribute to the image.

The number of composite shots to be migrated for migration by shotpoint modulation can be further reduced. A maximum slowness parameter $p_{max}$ can be defined which can be calculated from a reference velocity v and a maximum angle $\theta_{max}$ by $p_{max}=\sin\theta_{max}/v$. By default, v is the surface speed and $\theta_{max}=90°$. A number of components to be migrated by frequency $M_f$ is defined such that $k_{max}=(M_f/2)\Delta k$ is the smaller of the following two values: the spatial Nyquist interval $k_{Nyz}=\frac{1}{2}\Delta x$ and $fp_{max}$. This means that components in k lying outside the range $[-fp_{max}, fp_{max}]$ are not migrated. This does not degrade the image since it is equivalent to reducing the number of individual shots by resampling them over the largest grid that satisfies the spatial Nyquist criterion for the given frequency. This means that migration by shotpoint modulation can be just as exact while being less expensive than migration by shotpoint.

Obtaining Gathers Indexed by p During Migration by Shotpoint Modulation

The above-described algorithm, which can be referred to as migration by shot modulation, makes it possible to obtain the same migration as when performing shotpoint migration but for smaller cost. There follows a description of a method suitable, during such a migration, for obtaining gathers indexed by slowness p. The range $[-p_{max}, p_{max}]$ is subdivided into $N_p$ ranges of width $\Delta p$. During migration of the composite shot corresponding to the frequency and to the wave number $(f,k_m)$, the contribution to the image of the composite shot is accumulated over the range in p corresponding to $p=k_m/f$. This is equivalent to resampling a regular grid of pitch $\Delta k$ using a regular grid of pitch $f\Delta p$, which can be done in various ways such as linear interpolation, cardinal sine, or band-limited interpolation, etc. . . . . . This resampling can be performed using precalculated weightings $\lambda_i(f,k_m)$, $i=0$, $N_p-1$ such that $\Sigma_i\lambda_i(f,k_m)=1$ which are used during the migration to update the various gathers by:

$$R_i(x,y,z) = \sum_{f,m} \lambda_i(f,k_m) R_{f,m}(x,y,z) \qquad (10)$$

where $R_{f,m}(x,y,z)$ is the contribution to the image of the composite shot corresponding to $(f,k_m)$;

$$R_{f,m}(x,y,z) = \overline{D_m(f,x,y,z)} U_m(f,x,y,z) \qquad (11)$$

and $R_i(x,y,z)$ is the element of the gather in p corresponding to the index i.

Migration by shotpoint modulation thus makes it possible to obtain gathers in p that are analogous to plane wave migration. However, the method of obtaining them is different. Migration by shot modulation uses shot composition that is independent of frequency and that corresponds to modulation, whereas migrations by plane waves uses shot composition that depends on frequency and corresponds to delays. A step specific to modulating migration, distribution depending on the frequency of the current contribution to the image amongst the gathers, enables modulated migration to obtain gathers that are indexed in p.

Figure 2:
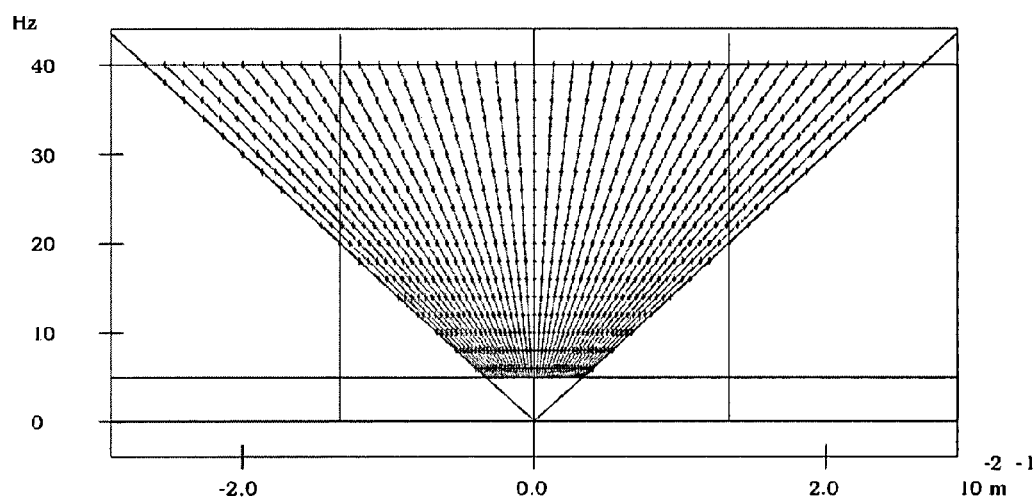
FIG. 2 represents in an f-k plane an example of composite shots to be migrated for plane wave migration.

The advantage of migration by shotpoint modulation is that the number of shots to be migrated is smaller than with plane wave migration. This is illustrated by FIGS. 1 and 2, where each cross corresponds to a composite shot. Under such circumstances, the cost of migration by shotpoint modulation is 42% the cost of migration by plane wave.

Migration by shotpoint modulation can use a composition matrix that depends on frequency, e.g. by using a periodization distance $x_{max}$ that depends on frequency $x_{max}(f)$.

Implementation Example

FIG. 5 shows the main steps (modulation, linear combination, then calculating gathers) in an example implementation of shotpoint migration of the type described above.

Shot modulation migration has two main parameters: the periodization distance $x_{max}$ and the maximum slowness $p_{max}$. For N being the number of shots and $\Delta x$ the distance between shots, the composition matrix is as follows:

$$C_{mn} = \frac{1}{\sqrt{N}} \exp\left(2j\pi m \frac{n\Delta x}{x_{max}}\right), \qquad (12)$$

$$m \in \left[-\frac{M_f}{2}, \frac{M_f}{2}\right], n \in [0, N-1]$$

with $$M_f = \min\left(2fp_{max}x_{max}, \frac{x_{max}}{\Delta x}\right) \qquad (13)$$

where $M_f$ is the number of composite shots to be migrated for the frequency f, the composite shot of index m corresponding to wave number $k_m=m/x_{max}$.

In order to calculate the gather of slownesses, after selecting the interval $\Delta p$ between gathers:

$$R_i(x,y,z) = \sum_{f,m} \lambda_i(f,k_m) R_{f,m}(x,y,z) \qquad (14)$$

where $R_{f,m}(x,y,z)$ is the contribution to the composite shot image and $\lambda_i(f,k_m)$ are the coefficients of a filter that resamples a grid of pitch $1/x_{max}$ to a grid of pitch $f\Delta p$.

Another Implementation Example

In a variant, instead of synthesizing modulated shots on the surface, these shots can be synthesized at depth. This procedure, described in the general case by Rietveld et al. (1992) applies to migration by shot modulation. Virtual sources are placed at a depth $z_0$ in a medium L at abscissa points $x_1$, and they are given respective amplitudes equal to the element of the composition matrix $C_{m1}(f),m$ that corresponds to a given wave number $k_m$ (the virtual sources may also be placed at different depths). For each m, the rising field generated by those virtual sources at depth is calculated at the positions of the N real sources (the positions of the individual shots, usually at depth $z=0$ and at abscissa points $x_n$). Wavelets $S_{mn}(f)$ are obtained. The complex conjugate $C_{mn}(f)=S_{mn}(f)*$ is then applied as the composition matrix for the surface sources. The quasi-unitary properties of propagation matrices mean that the downgoing wave from the composite shot will have the desired form for a sequence of modulated shots once it has been extrapolated to the depth $z_0$. This makes it possible to have gathers in which the complexity of propagation between the surface and the depth $z_0$ has been removed.

The sources may also be placed at different depths.

The 3D Case

The method described can be generalized to 3D processing.

The sources are indexed n=0,N−1 and occupy positions $(x_n, y_n)$ on a grid of pitch $\Delta x$ in the x direction and $\Delta y$ in the y direction.

Definition of parameters $x_{max}$ and $y_{max}$, $p_{max}$, $\Delta p_x$, $p_{ymax}$, and $\Delta p_y$ For each frequency, $M_x(f)$ and $M_y(f)$ are calculated as follows:

$$M_x(f) = \min\left(2fp_{x_{max}}, \frac{x_{max}}{\Delta x}\right), \quad (15)$$

$$M_y(f) = \min\left(2fp_{y_{max}}, \frac{y_{max}}{\Delta y}\right)$$

Wave numbers $kx_{m_x}$ and $ky_{m_y}$ are calculated indexed by $m_x$, $m_y$ with $$m_x = [(-M_x(f)/2, M_x(f)/2] \text{ and } m_y = [(-M_y(f)/2, M_y(f)/2]$$

as follows:

$$kx_{m_x} = \frac{m_x}{x_{max}}, \quad ky_{m_y} = \frac{m_y}{y_{max}} \quad (16)$$

The downgoing and upgoing waves of the composite shots derived from the waves of the individuals shots are calculated as follows:

$$D_{m_x,m_y}(f, x, y, z = 0) = \sum_{n=0}^{N-1} C_{m_x,m_y,n} d_n(f, x, y, z = 0) \quad (17)$$

$$U_{m_x,m_y}(f, x, y, z = 0) = \sum_{n=0}^{N-1} C_{m_x,m_y,n} u_n(f, x, y, z = 0)$$

$$m_x = -\frac{M_x(f)}{2}, \frac{M_x(f)}{2}, \, m_y = -\frac{M_y(f)}{2}, \frac{M_y(f)}{2}$$

with:

$$C_{m_x,m_y,n} = \frac{1}{\sqrt{N}} \exp[2j\pi(kx_{m_x} x_n + ky_{m_y} y_n)] \quad (18)$$

For all mx, my, $\Delta_{mx,my}$ and $U_{mx,my}$ are extrapolated for all values of z over the grid of pitch $\Delta z$.

The contribution of the composite shot $m_x$, $m_y$ to the image is calculated as follows:

$$R_{f,m_x,m_y}(x,y,z) = \overline{D_{m_x,m_y}(f,x,y,z)} U_{m_x,m_y}(f,x,y,z) \quad (19)$$

Slowness vector gathers $p=(p_x,p_y)$ indexed in $i_x$, $i_y$, corresponding to $p_x=i_x Dp_x$, $p_y=i_y Dp_y$ are updated as follows:

$$R_{i_x,i_y}(x, y, z) = \sum_{f,m_x,m_y} \lambda_{i_x,i_y}(f, kx_{m_x}, ky_{m_y}) R_{f,m_x,m_y}(x, y, z) \quad (20)$$

where $\lambda_{i_x,i_y}(f,kx_{m_x},ky_{m_y})$ is a filter that interpolates a two-dimensional grid of pitch $\Delta k_x$, $\Delta k_y$ to a grid of pitch $f\Delta p_x$, $f\Delta p_y$.

REFERENCES

P. S. Schultz, J. F. Claerbout (1978): Velocity estimation and downward continuation by wavefront synthesis, Geophysics, 43, 691-714.

W. E. A. Rietveld, A. J. Berkhout, C. P. A. Wapenaar (1992): Optimum seismic illumination of hydrocarbon reservoirs, Geophysics, 57, 1334-1345.

C. C. Ober., L. A. Romero, D. C. Ghiglia (2000): Method of migrating seismic records, U.S. Pat. No. 6,021,094, granted Feb. 1, 2000.

P. Lailly, B. Duquet, A. Ehinger (2000): Méthode pour réaliser en 3D avant sommation, une migration de données sismiques [A method of performing 3D migration of seismic data prior to summing], French patent No. 2 784 195, published on Apr. 7, 2000.

B. Duquet, P. Lailly, A. Ehinger (2001): 3D plane wave migration of streamer data. SEG 71$^{st}$ Annual International Meeting, Expanded Abstracts 1033-1036.

L. A. Romero, D. C. Ghiglia, C. C. Ober, S. A. Morton (2000): Phase encoding of shot records in prestack migration, Geophysics, 65, 426-436.

The invention claimed is:

1. A seismic processing method of the migration type, comprising the steps of:
    linearly combining downgoing seismic waves generated at a plurality of shotpoints by different seismic sources, and upgoing seismic waves recorded by a plurality of seismic sensors;
    notionally propagating the composite seismic waves as obtained in this way in order to obtain migrated downgoing and upgoing seismic waves for different depths; and
    determining at a plurality of depths at least one characteristic of the subsoil as a function of the upgoing and downgoing seismic waves propagated in this way; and
    the method further comprising the step of calculating the downgoing (respectively upgoing) composite waves by a linear combination of downgoing (respectively upgoing) waves in which said downgoing (respectively upgoing) waves are weighted by the coefficients of a spatial modulation matrix which is a function of the positions of the shotpoints.

2. A seismic processing method according to claim 1, in which, for a line of shotpoints, a weighting applied to a downgoing wave or an upgoing wave is:

$$\exp(2j\Pi k_m x_n)$$

where $k_m$ is a wave number defined by $m\Delta k_x$, with m being an integer corresponding to the index of the calculated composite wave and $$\Delta k_x = 1/x_{max}$$

where $x_{max}$ is a periodization distance.

3. A method according to claim 1, in which, for a grid of shotpoints in two dimensions x and y, a weighting applied to a downgoing or upgoing wave for shots at positions $x_n$, $y_n$ is:

$$\exp[2j\Pi(kx_{mx} x_n + ky_{my} y_n)]$$

where $k_{mx}$ and $k_{my}$ are two wave numbers given by:

$$k_{mx} = mx\Delta k_x \text{ and } k_{my} = my\Delta k_y$$

with mx and my being two integers corresponding to the indices of the calculated composite wave, and $$\Delta k_x = 1/x_{max}$$

where $x_{max}$ is a periodization distance, and $$\Delta k_y = 1/y_{max}$$

where $y_{max}$ is a periodization distance.

4. A method according to claim 2, or claim 3, in which the periodization distance(s) depend(s) on frequency.

5. A method according to claim 2, in which for each frequency f, a number $M_f$ of downgoing or upgoing composite waves that are calculated and over which the migration processing is applied is $M_f$ such that $k_{max}=(M_f/2)\Delta k$ is the smaller of two values constituted firstly by the spatial Nyquist interval $k_{Nyq}=\frac{1}{2}\Delta x$ and secondly $fp_{max}$, where $p_{max}$ is a maximum slowness parameter.

6. A method according to claim 3, in which for each frequency f, the indices mx and my lie respectively in the ranges $[-M_x(f)/2, M_x(f)/2]$ and $[-M_y(f)/2, M_y(f)/2]$, where $M_{xf}$ and $M_{yf}$ are such that $kx_{max}=(Mx_f/2)\Delta k$ is the smaller of two values constituted firstly by the spatial Nyquist intervals $k_{Nyq}=\frac{1}{2}\Delta x$ and secondly by $fp_{max}$, where $p_{max}$ is a maximum slowness parameter, and $ky_{max}=(My_f/2)\Delta k$ is the smaller of two values constituted firstly by the spatial Nyquist interval $k_{Nyq}=\frac{1}{2}\Delta y$ and secondly $fp_{max}$, where $p_{max}$ is a maximum slowness parameter.

7. A method according to any preceding claim, in which the migrated gathers are calculated by distributing the contribution to the image of the composite shotpoints over ranges that are a function of slowness parameters.

* * * * *